Figure 1:
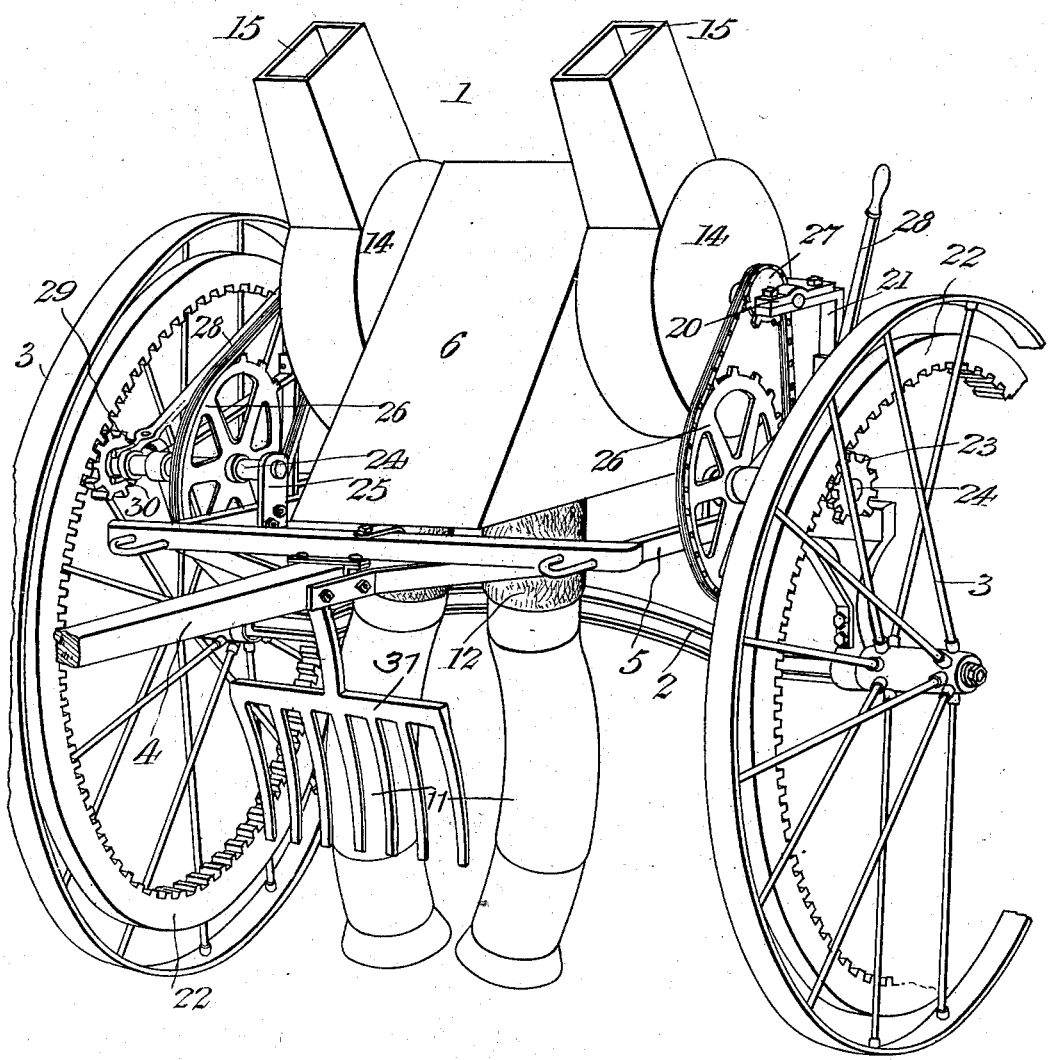

No. 752,790. PATENTED FEB. 23, 1904.
W. B. MILLER.
PNEUMATIC BOLL WEEVIL MACHINE.
APPLICATION FILED APR. 2, 1903.
NO MODEL. 3 SHEETS—SHEET 1.

Witnesses
W. B. Miller, Inventor
by C. A. Snow & Co.
Attorneys

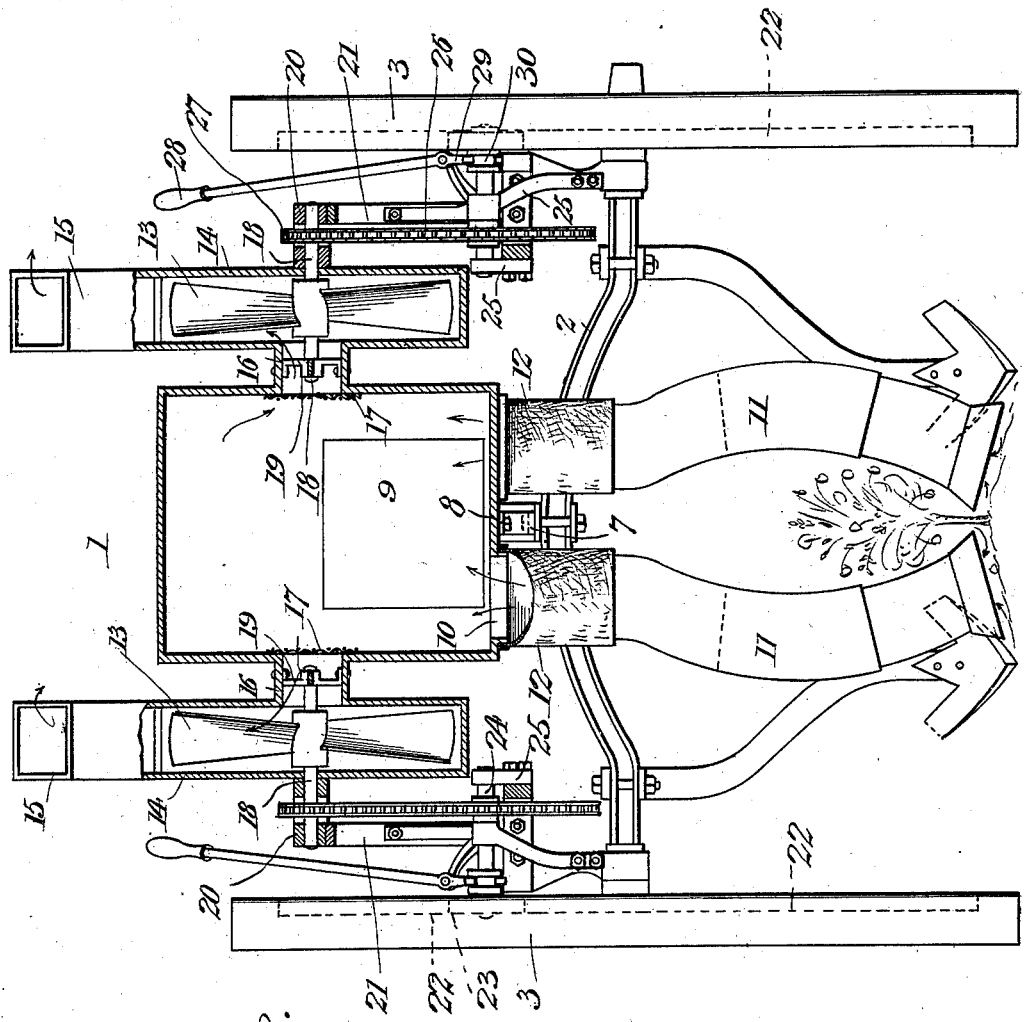

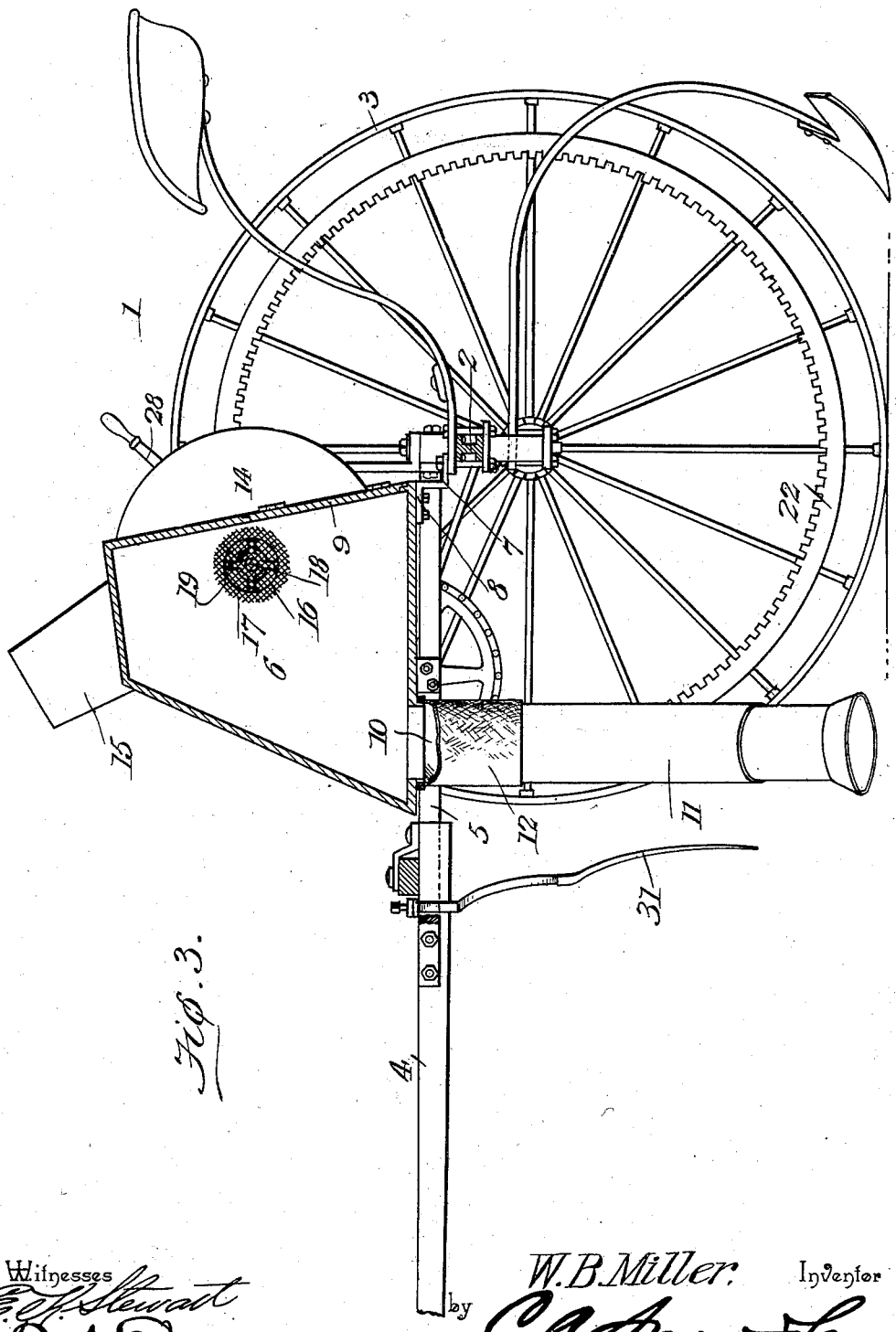

No. 752,790. Patented February 23, 1904.

UNITED STATES PATENT OFFICE.

WILLIAM B. MILLER, OF BELTON, TEXAS.

PNEUMATIC BOLL-WEEVIL MACHINE.

SPECIFICATION forming part of Letters Patent No. 752,790, dated February 23, 1904.

Application filed April 2, 1903. Serial No. 150,832. (No model.)

*To all whom it may concern:*

Be it known that I, WILLIAM B. MILLER, a citizen of the United States, residing at Belton, in the county of Bell and State of Texas, have invented a new and useful Pneumatic Boll-Weevil Machine, of which the following is a specification.

In cotton culture considerable trouble and annoyance are occasioned and material losses entailed by weevils. These insects pierce the young unripe cotton-bolls for depositing their ovum therein, and the bolls when so pierced are rendered faulty and soon fall from the stalk to the ground, where they usually remain until the ovum generates. Thus the affected bolls are lost to the final cotton production, and the insects are constantly multiplied.

My invention has for its objects to produce a device by which the affected bolls may be readily gathered during the cultivation of the cotton and be destroyed, thus exterminating the deleterious insects; and it consists of a comparatively simple and inexpensive mechanism adapted for attachment to a cultivator of ordinary type, which acts to gather the bolls during the ordinary operations of the cultivator.

To this end the invention comprises the novel details of construction and combination of parts more fully hereinafter described.

In the accompanying drawings, Figure 1 is a perspective view of a cultivator having my improved mechanism applied thereto. Fig. 2 is a front sectional elevation of the same. Fig. 3 is a side sectional elevation.

Referring to the drawings, 1 indicates a cultivator having an arched axle 2, ground-wheels 3, mounted for rotation thereon, a tongue 4, and frame-bars 5. These parts may all be of the usual or any desired construction and material, inasmuch as they constitute no part of the present invention.

In accordance with my invention I mount upon the cultivator a vacuum box or chamber 6, which is secured to the framework of the cultivator in any suitable manner, but preferably by means of a clip 7, secured to the axle and provided with an upwardly-extended portion 8, to which the vacuum-chamber is bolted. The chamber 6 is provided in its rear wall with a door 9, through which the contents of the chamber may be removed when desired, and with suitable openings 10 through its bottom, which communicate with depending suction-conduits 11. There are a pair of these conduits, which are associated with the vacuum-chamber each by means of a flexible connection 12 of any suitable impervious material—such, for example, as leather, rubber, or the like. These conduits, which are positioned to lie one at either side of the cotton-stalk, are curved longitudinally, as shown in Fig. 2, to permit the free passage of the cotton-plant between them and at the same time provide for their lower ends lying close to the stalk at its base. The conduits are composed of any suitable material, but are preferably of sheet metal, and consist each of a plurality of telescopic sections, and the lower end of each conduit, which terminates in close proximity to the ground, is provided with a flaring mouth, preferably of elliptical form.

Air is exhausted from the vacuum-chamber 6 by means of a pair of exhaust-fans 13, situated one at either side of the vacuum-chamber and mounted each in a suitable fan-case 14, provided with a discharge spout or outlet 15. Each fan-case communicates with the vacuum-chamber by means of a short connecting tube or flue 16, which is provided at its inner end, which connects with the chamber, with a suitable covering of recticulated material 17 to prevent the passage of any part of the contents of the chamber into the fan-case. Each fan is mounted upon a drive-shaft 18, which is supported at its inner end by a spider-bearing 19, bolted or otherwise secured within the tube 16, and at its outer end by a suitable bearing 20, supported by a casting 21, secured at its lower end to the framework of the machine, the shaft 18 being driven to impart motion to the fan by mechanism now to be described, and inasmuch as the mechanism for driving one fan is identical in construction and operation with that for driving the other I will describe but one of these mechanisms in detail.

Detachably secured in any suitable manner to the ground-wheel 3 is an internally-toothed gear-ring 22 in mesh with a pinion 23, fixed upon a shaft 24, journaled in suitable bearings 25, secured to the framework of the machine. 26 is a sprocket-gear also fixed for rotation with the shaft 24 and in chain connection with a sprocket-pinion 27, fixed upon the shaft 18. Hence it will be seen that as the ground-wheel 3 rotates during the travel of the machine over the ground motion will be imparted from the gear-ring 22 to pinion 23 and thence to the fan 13 through the medium of sprocket-gear 26 and pinion 27. The gear 23 may be moved longitudinally of the shaft 24 for throwing it into and out of mesh with the gear-ring 22 by means of a lever 28, having a bifurcated end 29, which engages a collar 30, formed upon the laterally-extended hub of the gear 23. Thus the parts may be readily thrown out of operation when desired in order to stop the fans, and, further, either fan may be stopped at will while the other continues to operate.

Suspended from the tongue 4 of the machine is a rake-like agitator 31, which during the operation of the machine brushes the cotton-plants to free them of any loose affected bolls which they may contain.

In operation the fans are driven in the manner above described for exhausting the air from the vacuum-chamber, which creates a suction through the conduits 11, as will be readily understood, sufficient to gather from the ground the bolls which have fallen from the cotton-plants, and these bolls will of course be drawn into the chamber 6, from which they may be removed from time to time through the door 9 for the purpose of burning, thus destroying the weevil ovum and contributing materially to the extermination of these insects. During the operation of the device the conduits 11 are prevented from injuring the plants owing to the fact that they are suspended loosely from the chamber by means of the flexible connection, which permits them to yield readily should they contact with the plants. When it is desired to employ the cultivator for ordinary use without bringing the boll-gathering mechanism into operation, the latter may be thrown out of operation by simply moving the pinions 23 out of mesh with the gear-rings 22 in the manner above explained and closing the sections of the conduits 11 one within the other to properly shorten the conduits to prevent them interfering with the plants.

From the foregoing it will be seen that I produce a simple and efficient mechanism which may be readily applied to any ordinary type of cultivator and which in operation will efficiently perform its functions for the attainment of the ends in view, and while I believe the mechanism herein described to be the best adapted for the purposes set forth it is to be understood that I do not limit or confine myself to the details of construction herein disclosed, inasmuch as various changes may be made therein without departing from the spirit or scope of the invention.

Having thus described my invention, what I claim is—

1. In a device of the class described, the combination with a vacuum-chamber provided with exhaust devices, of mechanism for operating the devices, and a pair of spaced open-ended suction-conduits depending vertically from the vacuum-chamber and having their upper ends communicating therewith and their lower ends terminating short of and adjacent to the ground for gathering material directly therefrom, the walls of said conduits being wholly impervious.

2. In a device of the class described, the combination with a vacuum-chamber, of means for exhausting air therefrom, and a pair of open-ended oppositely-curved spaced suction-conduits depending vertically from the vacuum-chamber and having their upper ends communicating therewith and their lower ends terminating short of and adjacent to the ground for gathering material directly therefrom, the walls of said conduits being wholly impervious.

3. In a device of the class described, the combination with a vacuum-chamber, of means for exhausting air therefrom, and a pair of open-ended longitudinally-adjustable suction-conduits suspended from the vacuum-chamber each by a flexible connection, said conduits being oppositely curved and spaced to permit the passage of cotton-plants between them and having wholly-impervious walls and their upper ends communicating with the chamber and their lower ends terminating short of and adjacent to the ground for gathering material directly therefrom.

4. In a device of the class described, the combination with a vacuum-chamber, of fan-cases communicating therewith, a shield for preventing the passage of material from the chamber to the fan-cases, fans mounted in the cases, mechanism for operating the fans, and a pair of open-ended spaced suction-conduits depending vertically from the vacuum-chamber and having their upper ends communicating therewith and their lower ends terminating short of and adjacent to the ground for gathering material directly therefrom, the walls of the said conduits being wholly impervious.

5. In a device of the class described, the combination with a vehicle having a frame and ground-wheels, of a vacuum-chamber sustained by the vehicle-frame, exhaust-fans associated with said chamber, mechanism operatively connected with and actuated by the ground-wheels for operating the fan, and a pair of open-ended spaced suction-conduits depending vertically from the vacuum-chamber and having their upper ends communicating therewith and their lower ends terminating short of and adjacent to the ground for gathering material directly therefrom, the walls of said conduits being wholly impervious.

6. In a device of the class described, the combination with a vehicle having a frame and ground-wheels, of gear-rings associated with the ground-wheels, a vacuum-chamber sustained by the frame, exhaust-fans associated with the chamber, gear connections between the gear-rings and fans for driving the latter during the travel of the vehicle over the ground, and a pair of open-ended spaced suction-conduits depending vertically from the vacuum-chamber and having their upper ends communicating therewith and their lower ends terminating short of and adjacent to the ground for gathering material directly therefrom, the walls of said conduits being wholly impervious.

In testimony that I claim the foregoing as my own I have hereto affixed my signature in the presence of two witnesses.

WILLIAM B. MILLER.

Witnesses:
A. G. VICK,
J. T. RATHER.